United States Patent [19]

Watanabe et al.

[11] 4,044,448
[45] Aug. 30, 1977

[54] METHOD OF ASSEMBLING ARTICLES OF FURNITURE

[76] Inventors: Kazuko Watanabe, 6 of 4 Nishikamata 6, Ohta, Tokyo; Mitsuko Arai, 12 of 9, Asagaya-minami 3, Suginami, Tokyo, both of Japan

[21] Appl. No.: 715,178

[22] Filed: Aug. 17, 1976

[30] Foreign Application Priority Data

Aug. 25, 1975   Japan ................................. 50-102690

[51] Int. Cl.² ............................................. B23P 19/04
[52] U.S. Cl. ..................................... 29/433; 108/111; 248/239
[58] Field of Search .................. 29/433; 108/111, 153; 248/239; 211/134, 153

[56] References Cited

U.S. PATENT DOCUMENTS

| 1,692,568 | 11/1928 | Prettyman | 108/153 X |
| 1,929,319 | 10/1933 | Korb | 108/111 |
| 3,207,331 | 9/1965 | Chasar | 211/134 X |
| 3,834,005 | 9/1974 | Johnson | 29/433 |
| 3,967,327 | 7/1976 | Severson | 108/111 X |

Primary Examiner—Victor A. Dipalma
Attorney, Agent, or Firm—Fidelman, Wolffe & Waldron

[57]           ABSTRACT

A method of making articles of furniture, which can be assembled or disassembled, by a suitable combination of a plurality of sheet-like assembling members. A single rope is passed through through-holes made in the assembling members to tighten up the members. The tractive force of the rope may be utilized in assembly or disassembly of articles of furniture. The articles as desired may be rigidly and extremely simply assembled.

5 Claims, 15 Drawing Figures

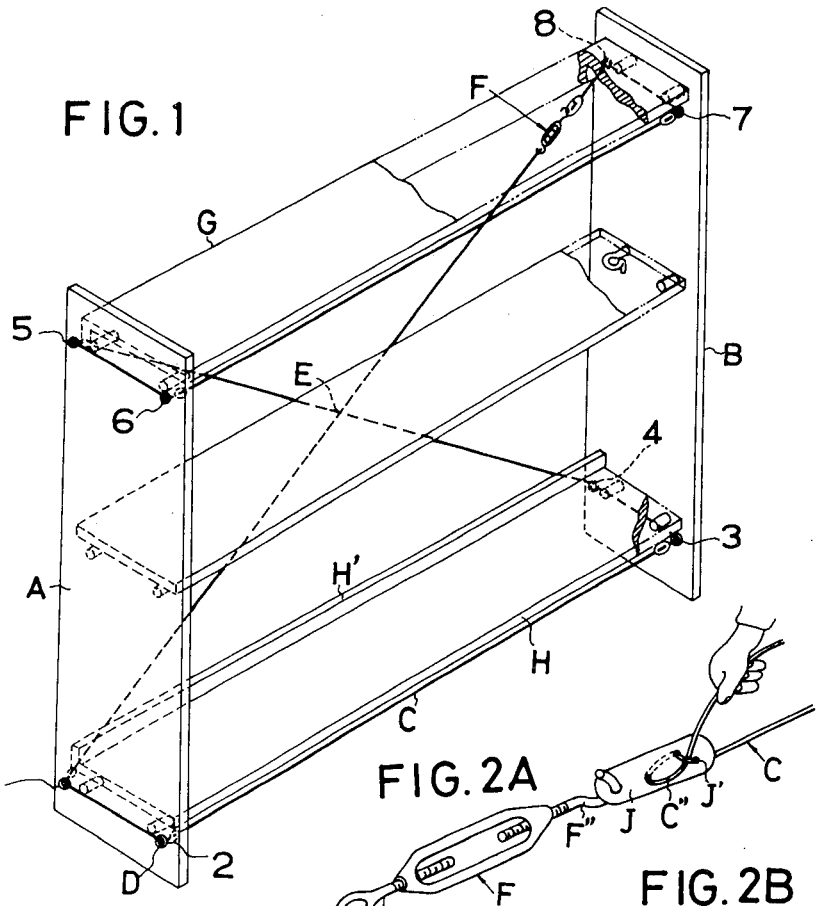
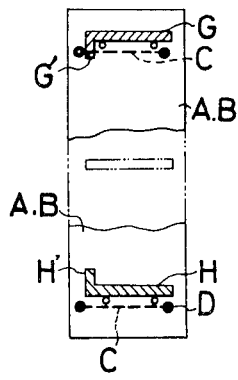
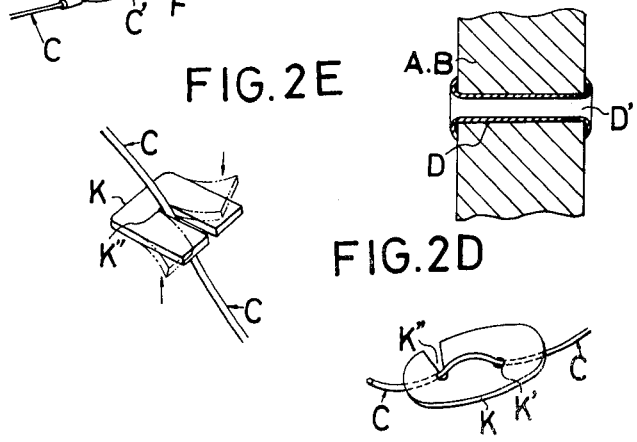

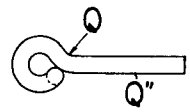
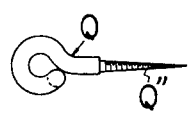
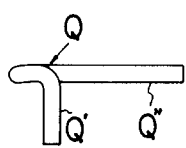
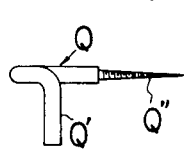
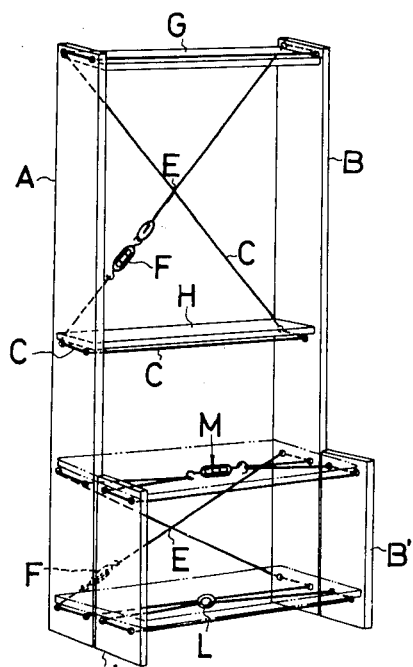
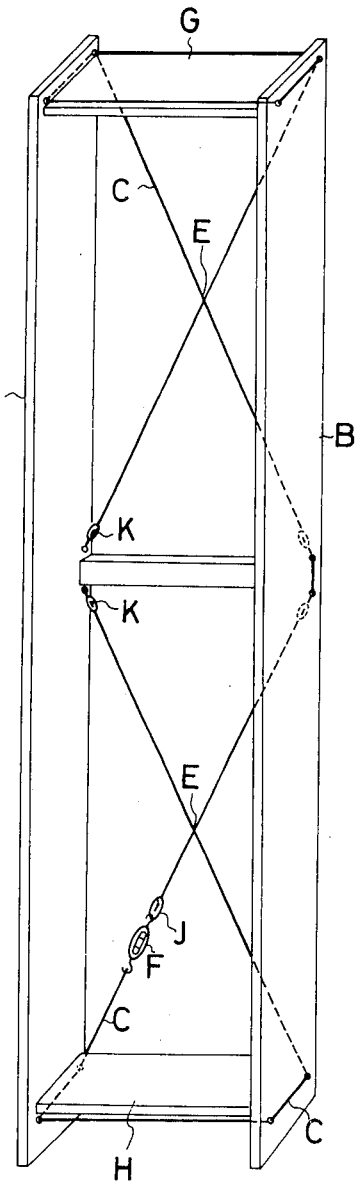
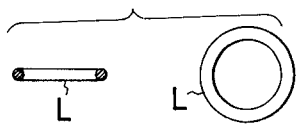

4,044,448

METHOD OF ASSEMBLING ARTICLES OF FURNITURE

This invention relates to a method of assembling articles of furniture, and more particularly, to a method of assembling articles of furniture which can be assembled and disassembled utilizing a tractive force of a single rope member passed through a plurality of sheet-like assembling members to tighten up the assembling members.

Articles of furniture applied to this invention include almost all kinds of furniture, for example, such as a chest of drawers including a tea-cabinet, a wardrobe and a cupboard; desks including a dining table, a study-desk and an office-desk; chairs; and various other articles including a locker, a bookcase, a book shelf, a shoe box, a bed, a work-bench, a display shelf, a book rack, etc. A variety of methods of assembling articles noted above as well as assembling members have heretofore been disclosed. According to the present invention, however, there is provided an assembling method wherein a plurality of sheet-like assembling members and a single rope member are assembled and tightened, whereby articles of furniture in a form as desired may extremely simply and rigidly be assembled (and disassembled).

The assembling members used include members formed from a material having a rigidity or a property similar thereto such as metal, plastics, bamboos, wood and the like, whereas the rope member used includes a yarn-like or string-like rope, or a (single) rope, which has a toughness and a good bending property, such as a wire made of steel or nylon. These assembling members and rope member may suitably be selected in consideration of various conditions of form, construction, strength, using operation and the like required by articles of furniture to be assembled under contemplation.

An article of furniture is made by drilling a hole through each of assembling members thus selected and prepared, a rope member being passed through said hole, inserting said rope into said holes successively, applying a tractive force in a predetermined positional relation so that said rope is tensioned by the action of said tractive force and at the same time the assembling members or rigid members come into cooperation with one another under pressure, and permitting said rope to maintain a predetermined tension, whereby the article as desired may be assembled in an extremely convenient manner to provide an article having a good strength. That is, the present invention is, in principle, based on a conception that tension is given rise to the rope which forms a structural member for a main body, and in other words, the invention relates to a method of assembling articles in relation to the tension construction. Incidentally, conventional articles of the type noted above require connecting fittings or the like used as a reinforcement or brace disposed between the assembling members, or means for maintaining strength such as a reinforcing jig placed at corner portions, or connecting members, while the present invention does not require those fittings noted above at all.

It is therefore a primary object of the present invention to provide a method which can assemble articles of furniture having an extremely good strength in an extremely simple manner, and as a consequence, such articles may be obtained extremely economically.

It is a further object of the present invention to provide a method which can assemble, as for example, a shelf or the like, using only frames and a wire, and as a consequence, an article may be made by members much less than is required by prior art articles, resulting in a great decrease in cost.

It is another object of the present invention to provide a method which can obtain versatile articles capable of being changed in design by suitably and desirably adjusting shape, height or width of an article to be assembled.

It is yet another object of the present invention to provide a method which can accomplish a disassembling work in an extremely convenient manner and which can, in moving assembled articles, convey them in a compact and easy manner.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

FIG. 1 is a perspective view of an article of furniture assembled by the method of this invention.

FIG. 2a illustrates tensioning means used with the article of FIG. 1.

FIGS. 2b, f and g are details of construction of the article of FIG. 1.

FIG. 2c is an end view of the article of FIG. 1.

FIGS. 2d and e are perspective views of alternative safety means.

Figure 7:
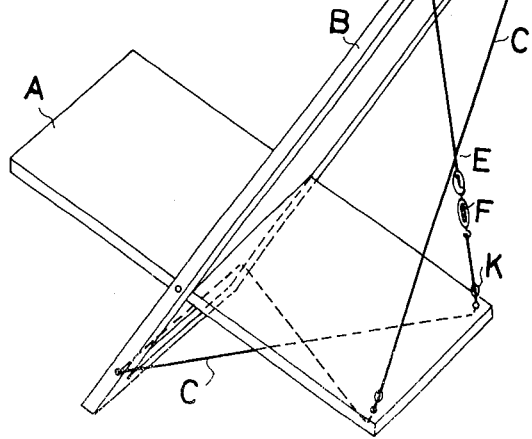

FIGS. 5 and 7 are alternative articles assembled using the method of this invention.

FIGS. 3, 6, 8A and 8B are articles of furniture assembled using an alternative method of this invention.

FIG. 4 is a component of the article of FIG. 3.

The assembled method of the present invention will now be described in detail by reference to essential embodiments shown in the accompanying drawings, in which the reference characters A, B, G, and H designate an assembling member, C a rope member, D a through-hole made in the assembling member, E a diagonal intersection of the rope, F a stretching adjusting means, J a fitting, K a safety means, these elements being used common to all of the figures.

FIG. 1 is a perspective view illustrating an embodiment in which the invention is applied to a bookcase or a book shelf as one example of furniture for purpose of better understanding an essential part of the present invention from a viewpoint of principle thereof. This book-shelf is assembled by opposedly disposing legs or frames in spaced relation, said legs or frames forming assembling members A, B made of a rigid material, passing one end of a wire, which forms a single rope member C of a predetermined length made of a soft material, through through-holes D successively in order of 1, 2, 3, 4, 5, 6, 7 and 8 as indicated in the figure, said holes being drilled in parallel fashion adjacent to end edges at upper and lower portions of the assembling members, said wire forming a diagonal intersection E in the back portion to connect said one end of wire or fore end with the other end by means of the stretching adjusting means F or a turnbuckle, turning said means to apply tension to the wire thereby allowing the assembling members A and B to come into cooperation with each other under pressure and assembling members G and H or shelves similarly made of a rigid material sat astride up and down between the assembling members A and B to come into cooperation with each other under pressure, and permitting said rope member C or wire to maintain a predetermined tension.

FIG. 2A is a perspective view, on an enlarged scale, illustrating details of the rope member C of which opposite ends are connected by a stretching adjusting means F. As may be understood from the figure, the rope member C has its base portion C' anchored to one adjustable part F' of the turnbuckle and the other fore portion C'' removably attached to the other adjustable part F'' thereof through the fitting J, which is formed with three wire receiving holes J' in the illustrated embodiment to prevent the wire received therein from being carelessly disengaged.

FIG. 2B is a sectional view, on an enlarged scale, illustrating details of an eyelet hole D' fitted for reinforcement into wire through-holes D drilled where necessary in the assembling members.

FIG. 2C illustrates an embodiment wherein a shelf structure provided with upright edge parts G' and H' at one end edge along the length of shelf members G and H among the assembling members A, B, G, and H is arranged as shown so that these shelf members, the legs or frame members A, B and the wire C powerfully act to one another to provide a stabilized structure.

FIG. 2D is an enlarged perspective view of a safety means K, which is provided to securely avoid deformation or disassembly of an assembled article in the event that the wire C is cut by an obstacle or the like. To this end, the wire C is suitably inserted in the safety means through wire receiving holes K' preformed therein at the time of assembly so as to be positioned where necessary, for example, in the neighborhood of the corners in the diagonal intersection E, whereby the wire may remain engaged in a notch K'', as shown, formed in the safety means when the article has been assembled.

FIG. 2E is an enlarged perspective view showing another embodiment of the safety means K, in which a wire C is inserted into a notch K'' as shown, after which the wire is held by a pliers or the like for insertion, the safety means being used in the same place as that shown in FIG. 2D.

FIGS. 2F and 2G are a plan view and a side view, respectively, on an enlarged scale, showing a shelf receiving member Q in two forms. As may clearly be shown in the figures, a vertical rod member Q' is placed in contact with the internal surfaces of legs or frames forming assembling members A, B to extremely securely position the member G or H forming a shelf member so that the latter may be fixed in position on the aforementioned legs or frames through mounting rods Q'' or mounting threaded rods Q'''.

It is structurally possible to place the article shown in FIG. 1 assembled in a manner as described above at the suitable service by applying, for example, a back plate (not shown) to the back portion of the article, and a door (not shown) to the front portion before hand when assembled or after the article has been assembled.

Next, FIGS. 3 and 5 illustrate another forms of embodiments in which the present invention is applied to an article different from that shown in the previous embodiment. Referring particularly to FIG. 3, there is shown at the lower part thereof an arrangement in which one article is connected to the other by a single rope member C using a ring L and a stretching adjusting means M modified from FIG. 1 or FIG. 2A, including two diagonal intersections E located up and down and two wire tension adjusting parts particularly in the lower portion. The detail of the ring L is shown in FIG. 4.

FIG. 5 illustrates an embodiment in the case of a locker or the like, which is small in width but high in height. In this case, two diagonal intersections E are formed at upper and lower portions by a single rope member C, and as shown, a wire can be inserted to obtain an article having a good strength. In this case, also, the back plate and door may be arranged in a manner similarly to the embodiment as previously mentioned.

Figure 6:
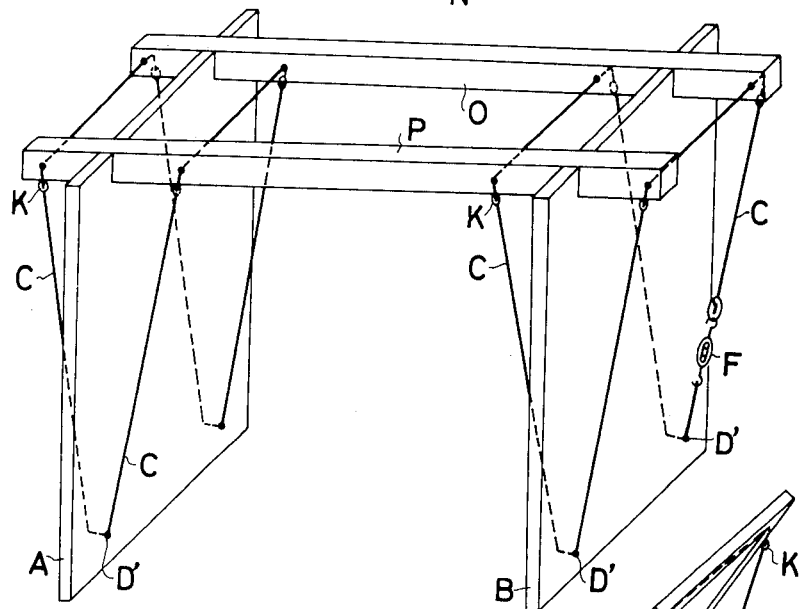

FIG. 6 illustrates an embodiment in the case of a table, in which assembling members or legs A and B are connected and assembled by assembling members or rib members O and P on which a table plate N is placed and a rope member C.

FIG. 7 illustrates an embodiment in the case of a chair, in which assembling members or a seat plate portion A and the back portion B are assembled by passing a single rope member C therethrough at the back portion in a procedure substantially similar to the foregoing. It will be noted in this case that fittings for securing strength are sometimes jointly used as occasion demands.

Figure 8A:
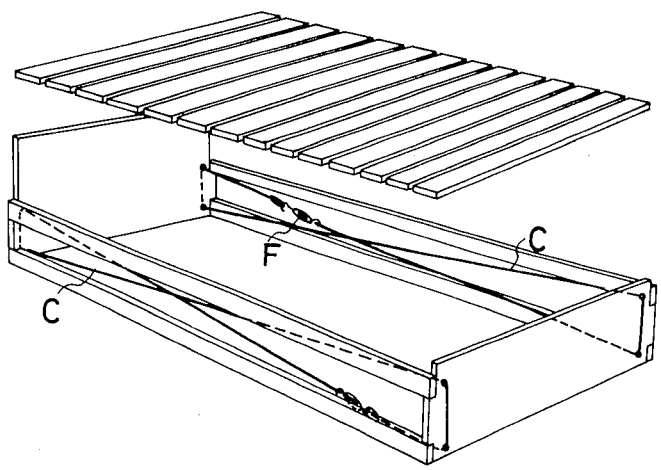
Figure 8B:
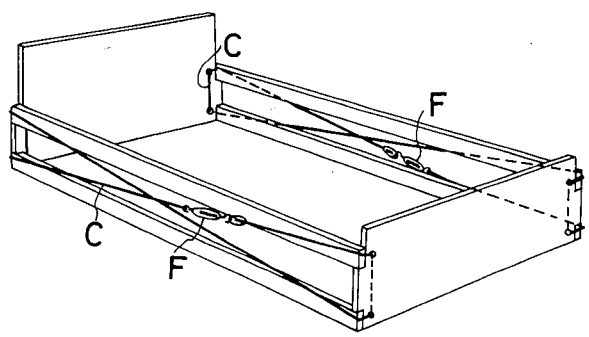

FIGS. 8A and 8B illustrate further embodiments in the case of a bed, in which two methods of inserting wire are given in two ways.

While various embodiments of the invention have been described, it is to be understood of course that the invention is not limited to the specific embodiments thereof but various modification may be made in the invention without departing from the spirit as defined in the appended claims since methods of passing the rope member C through assembling members are variously considered depending on articles of furniture to be assembled and the assembling members are also variously employed.

According to the present invention, therefore, those objects as noted above can fully be achieved, and in addition, frontage adjustment (in case of a shelf, locker or the like), fine adjustment of an angle of the back (in case of a chair), adjustment in size depending on using place, and adjustment in registration with height of users may conveniently be made. Moreover, the present invention may form a wire construction in the rear portion to provide a combination and in addition, the article of the invention is of a soft construction in its entirety so that it may bear even an earthquake. From the foregoing, the present invention is of extremely extensive utility value and is very useful, convenient and epoch-making.

We claim:

1. A method of assembling articles of furniture from a single rope member made of a soft material, combined with assembling members made of a rigid material, comprising the steps of:
   passing one end of said single rope member successively through said assembling members, said assembling members arranged in predetermined positional relationships with each other;
   forming at least one diagonal intersection of said rope member;
   connecting said one end of said rope member to the other end of said rope member through an adjustable stretching means;
   applying tension to said rope member by adjusting said adjustable stretching means causing said assembling members to cooperate with each other under pressure; and maintaining said rope member at a predetermined tension whereby the rigidity of the structure is retained.

2. A method according to claim 1 wherein said article of furniture includes groupings of said assembling members, said members within each one of said groupings joined together under pressure by one of said ropes under tension, and an assembling member being common to more than one of said groupings.

3. The method of claim 1 wherein said rope member is comprised of yarn-like or string-like material.

4. The method of claim 1 wherein said rope member is comprised of steel wire.

5. The method of claim 1 wherein said rope member is comprised of nylon material.

* * * * *